United States Patent
Vo et al.

(10) Patent No.: US 6,256,612 B1
(45) Date of Patent: Jul. 3, 2001

(54) END-TO-END CODER/DECODER (CODEC)

(75) Inventors: Kim Phuc Vo; Suhail Hasan; Jean-Francois Bertrand, all of Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/396,252

(22) Filed: Sep. 15, 1999

Related U.S. Application Data
(60) Provisional application No. 60/110,811, filed on Dec. 3, 1998.

(51) Int. Cl.[7] .......................... G10L 21/00; G10L 11/00; G10L 11/02
(52) U.S. Cl. .................. 704/500; 704/270; 704/201; 704/211
(58) Field of Search .................... 704/221, 201, 704/270

(56) References Cited

U.S. PATENT DOCUMENTS

| | | | |
|---|---|---|---|
| 5,450,472 | * | 9/1995 | Brax ........................... 455/557 |
| 5,608,779 | | 3/1997 | Lev et al. ........................ 379/88 |
| 5,956,673 | * | 9/1999 | Weaver, Jr. et al. .............. 704/221 |
| 6,006,189 | * | 12/1999 | Strawczynski et al. ............ 704/201 |
| 6,014,375 | * | 1/2000 | Janky ............................ 370/347 |
| 6,091,969 | * | 7/2000 | Brophy et al. .................. 704/221 |

FOREIGN PATENT DOCUMENTS

| | | |
|---|---|---|
| 0750441A1 | 1/1996 | (EP) . |
| 19600406A1 | 1/1996 | (DE) . |
| WO 97/02713 | * 1/1997 | (WO) .................. H04Q/7/24 |
| WO 99/31911 | 6/1999 | (WO) . |

OTHER PUBLICATIONS

"Network Functions for the Application of Multi–rate Speech Coding in Digital Cellular Systems", Jun. 1994, pp. 306–310.
"Voice Communication Connection Control in Digital Public Land Mobile Networks", Jul. 1992, pp. 1702–1709.

* cited by examiner

*Primary Examiner*—Richemond Dorvil
*Assistant Examiner*—Daniel A Nolan
(74) *Attorney, Agent, or Firm*—Smith, Danamraj & Youst, P.C.

(57) ABSTRACT

A method of reducing speech delay and improving speech quality in digital transmission systems by implementing a single coder-decoder (codec) for an entire speech path from a calling party to a called party. The method is applicable to calls between mobile subscribers and between a mobile subscriber and an H.323 client terminal in a data network. After obtaining location information for the called party, an indication of a requested codec is sent from the calling party to the called party utilizing Integrated Services Data Network User Part (ISUP) or Primary Rate Interface (PRI) out-of-band signaling during call setup. If the called party supports the requested codec, a confirmation of the requested codec is sent from the called party to the calling party. A speech path is then established between the parties, and a single codec translation is performed for the entire speech path. If the called party does not support the calling party's codec, but the serving MSCs for both parties support the calling party's codec, the calling party's codec is utilized all the way to the called party's serving MSC. One additional codec translation is then performed in the called party's serving MSC to convert to the codec supported by the called party.

3 Claims, 6 Drawing Sheets

END-TO-END CODER/DECODER (CODEC)

PRIORITY STATEMENT UNDER 35 U.S.C. § 119(e) & 37 C.F.R. § 1.78

This nonprovisional application claims priority based upon the prior U.S. provisional patent application entitled, "System and Method for Providing Mobile Stations in a Radio Telecommunications Network With Multimedia Services Over Packet-Based Networks", application No. 60/110,811, filed Dec. 3, 1998, in the names of Hung Tran, Kim Vo, Bartosz Balazinaki, Jean-Francois Bertrand, Laura Hernandez, and Suhail Hasan.

BACKGROUND OF THE INVENTION

1. Technical Field of the Invention

This invention relates to telecommunication systems and, more particularly, to a method of reducing speech delay in digital transmission systems by implementing a single coder-decoder (codec) for an entire speech path.

2. Description of Related Art

Today, in calls from a first mobile subscriber (MS) to a second MS in a cellular telephone network, two codec translations are performed: (1) a translation from an IS-136-based codec to a G.711 codec in a transcoder unit (TRAU) at the originating mobile switching center (MSC), and (2) a translation from a G.711 codec to an IS-136-based codec at a TRAU in the destination serving MSC. These multiple codec translations introduce speech delay and deterioration of speech quality. In an MS-to-MS call, the end-to-end measured average delay is on the order of 210 to 240 milliseconds.

For calls being routed over an Internet Protocol (IP) network, H.323, H.225, and H.245 are a family of ITU standards for packet-based multimedia (audio and video) communications systems. This family of standards permits calls between PC-based phone terminals (clients) in the IP network (LAN or WAN), or between client terminals and phone terminals in the Public Switched Telephone Network (PSTN) or the Public Land Mobile Network (PLMN) in an integrated network. An H.323 Gateway in the H.323 standard provides an interface between the IP network and the PSTN or PLMN, including the audio codec translation.

For a call between an MS in an IS-136 cellular network and an H.323 client in an IP network, the call setup and voice path must go through the H.323 Gateway. Presently, H.323 version 2 Gateways only support G.711 codecs, along with a few other codecs such as G.728. No IS-136-based codecs are supported by the Gateway. Thus, the audio stream, which is transmitted from the calling MS to the originating MSC over the air interface utilizing an IS-136-based codec, must be translated at the originating MSC to G.711. The IS-136-to-G.711 codec translation takes place in a TRAU so that the audio stream coming out of the originating MSC on the pulse code modulation (PCM) link is G.711-coded. When the G.711 codec is utilized between the Gateway and the client, it requires a relatively large packet to transport the 64 Kbs bandwidth required for the voice stream. This worsens the speech delay and jitter problems on the LAN/WAN segment.

Tandem Free Operation (TFO) is an existing methodology utilized to improve speech quality by using only one codec in an MS-to-MS speech path. TFO is applicable only to MS-to-MS calls, however, and does not support calls from an MS to a H.323 client. With TFO, call setup essentially takes place as it normally does without TFO. After the call has been established between the two MSs, a TFO negotiation session begins using inband signaling to establish the type of codec that should be utilized in the call. Only after the completion of this negotiation session does the call get into native codec speech position. As a result, although TFO may improve speech quality by using only one codec in a speech path, there is still an undesirable waiting period in TFO calls before native codec speech can flow due to the TFO negotiation session.

In order to overcome the disadvantage of existing solutions, it would be advantageous to have a method of reducing speech delay in digital transmission systems by implementing a single codec for an entire speech path. Such a method would be performed during call setup, and would not introduce additional speech delays. The present invention provides such a method.

SUMMARY OF THE INVENTION

In one aspect, the present invention is a method of reducing speech delay in digital transmission systems by implementing a single coder-decoder (codec) for an entire speech path from a calling party to a called party. The method includes the steps of sending an indication of a requested codec from the calling party to the called party utilizing out-of-band signaling during call setup, determining by the called party whether the requested codec can be utilized for the call, and sending a confirmation of the requested codec from the called party to the calling party upon determining that the requested codec can be utilized. This is followed by establishing a speech path from the calling party to the called party, and performing a single codec translation for the entire speech path.

In another aspect, the present invention is a method of reducing speech delay in a digital transmission system by implementing a single codec for an entire speech path from a calling mobile subscriber to a called mobile subscriber. The method begins by originating a call from the calling mobile subscriber to a first mobile switching center (MSC) which is serving the calling subscriber, and obtaining a routing number for the called mobile subscriber from a second MSC which is serving the called mobile subscriber. Then, utilizing out-of-band signaling during call setup, an indication of a requested codec type is sent from the first MSC to the second MSC, and a confirmation of the requested codec type is sent from the second MSC to the first MSC. This is followed by establishing a speech path from the calling mobile subscriber to the called mobile subscriber, and performing a single codec translation for the entire speech path.

In yet another aspect, the present invention is a method of reducing speech delay in a digital transmission system by implementing a single codec for an entire speech path from a calling mobile subscriber to a called PC-based client phone terminal in a data network. The method begins by originating a call from the calling mobile subscriber to an MSC which is serving the calling subscriber, and obtaining from a gatekeeper in the data network, an indication of a gateway serving the called client terminal. Then, utilizing out-of-band signaling during call setup, an indication of a requested codec type is sent from the MSC to the gateway, the gateway determines whether the called client terminal supports the requested codec type, and a confirmation of the requested codec type is sent from the gateway to the MSC. This is followed by establishing a speech path from the calling mobile subscriber to the called client terminal, and performing a single codec translation for the entire speech path.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
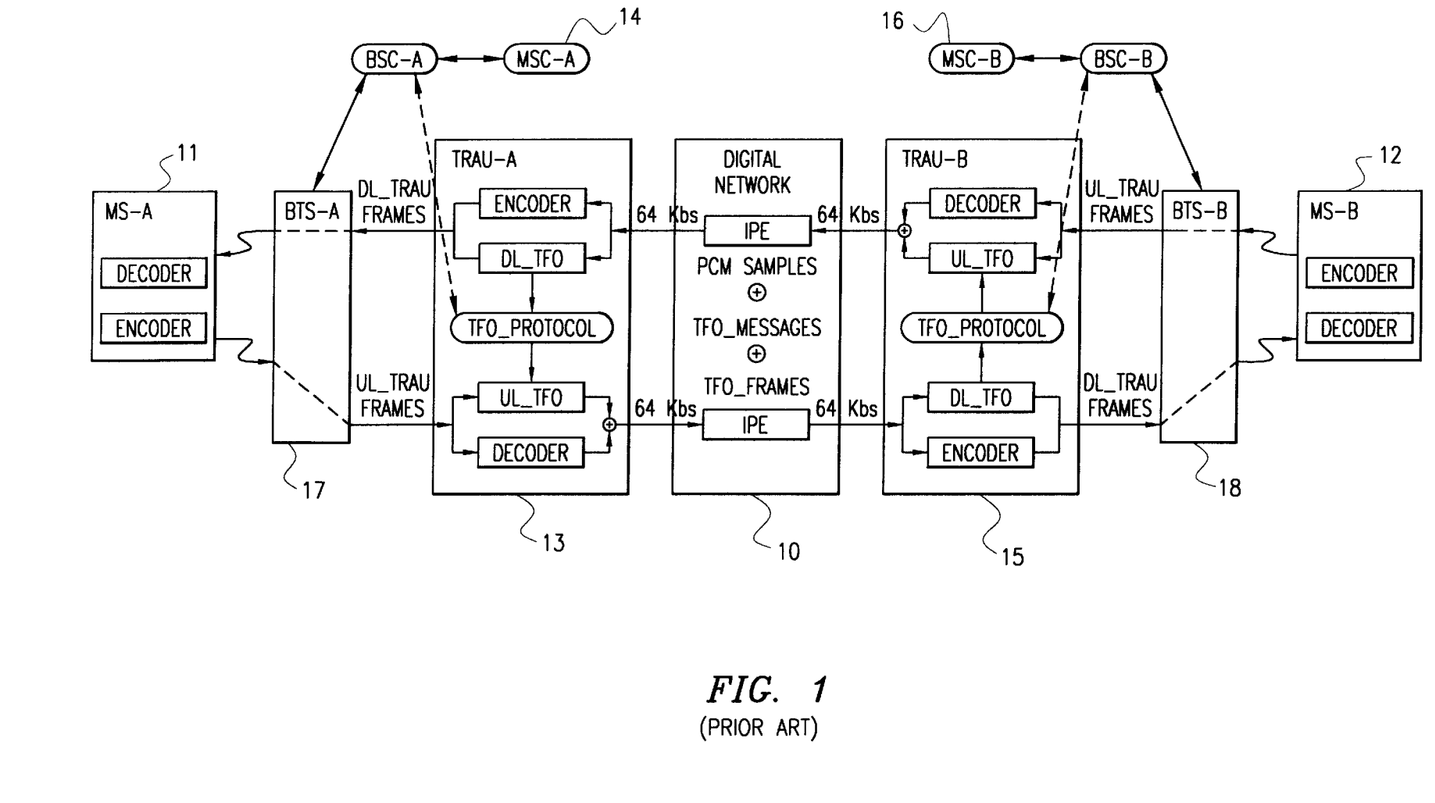
FIG. 1 (Prior Art) is a simplified block diagram illustrating the existing methodology of Tandem Free Operation (TFO) for an MS-to-MS call.

FIG. 1 is a simplified block diagram illustrating the existing methodology of Tandem Free Operation (TFO) for an MS-to-MS call being placed from a first MS (MS-A) 11 to a second MS (MS-B) 12 through a digital network 10. TFO utilizes inband signaling by replacing the least significant bit of every $16^{th}$ speech sample in PCM with a TFO frame to deliver signals at 500 bits/sec that are embedded in the 64 Kbs voice path. If a full rate codec is utilized, TFO frames are transferred in the two least significant bits of every PCM sample.

TRAU-A 13 is associated with MSC-A 14, the originating MSC. TRAU-B 15 is associated with MSC-B 16, the destination serving MSC. The TFO negotiation session begins after Integrated Services Digital Network User Part (ISUP) or Primary Rate Interface (PRI) signaling has led to the seizure of a voice circuit between TRAU-A 13 and TRAU-B 15. TRAU-A determines which codecs are supported by both MS-A 11 and base transceiver station (BTS-A) 17 and sends this information in a first signal called TFO__REQuest. The TFO__REQuest signal takes 140 ms to deliver 70 bits of information from TRAU-A to TRAU-B. TRAU-A sends this message for a maximum of 5 seconds until an answer is received. TRAU-B then determines which codecs are supported by both MS-B 12 and BTS-B 18 and sends this information to TRAU-A in a TFO__ACKnowledge signal which also delivers 70 bits in 140 ms. Thus, the total time savings possible by eliminating the TFO negotiation session in the MS-to-MS case is at least 280 ms.

If different codecs are being used on the two sides, one side performs an intracell handoff of the MS to change to the correct codec, based on a predefined prioritization of codecs. TFO is normally established approximately 0.5 seconds after the speech channel is established.

The present invention provides an End-to-End Codec (ETEC) process which differs from the TFO process in the following aspects:

(1) ETEC is used during the call setup phase, whereas TFO is used after the call setup phase.

(2) ETEC signaling is out-of-band, utilizing Integrated Services Digital Network User Part (ISUP) and/or Primary Rate Interface (PRI) signaling, as opposed to inband signaling for TFO in which negotiation is done on the PCM link normally used for speech.

(3) ETEC extends within packet-based communications systems such as H.323 networks to client terminals through the H.245 protocol, whereas TFO signaling applies only to MS-to-MS calls, and terminates at the Gateway on the IP side.

By extending the native codec from end (MS) to end (H.323 client), the speech delay is significantly reduced through the elimination of codec translations. The present intention reduces the speech delay caused by the codec translation in MS-to-MS calls and in MS to/from H.323 client calls. The ETEC process eliminates the conversion of codec types by using only one codec, end-to-end, for the whole call path. In the case of a call from an MS to an H.323 client, the audio stream from cellular air interface codecs (IS-136-based VCELP, ACELP, US-1, GSM, or CDMA) is passed unaltered. At the client terminal, the audio stream is converted to speech directly. Two scenarios utilizing ETEC are described below.

MS to/from MS

Figure 2:
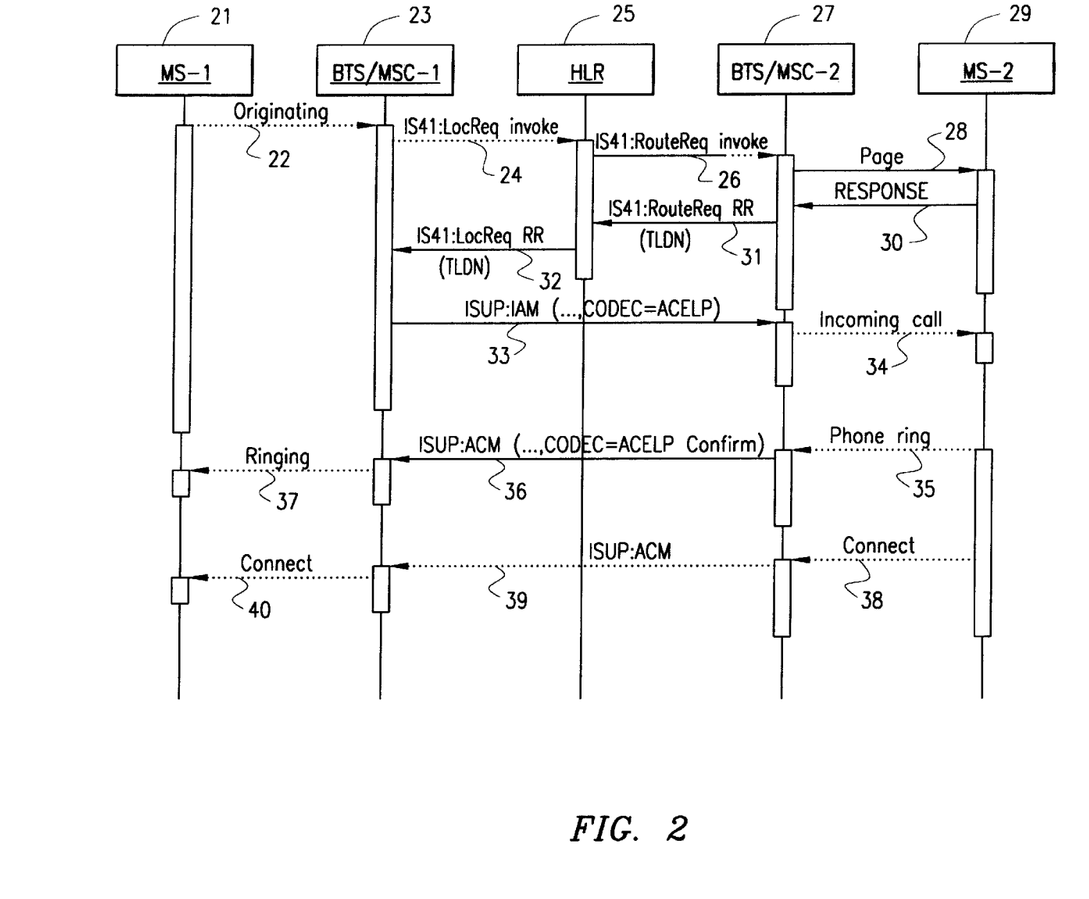
FIG. 2 is a message flow diagram illustrating the flow of messages between the nodes of a cellular network when an End-to-End Codec (ETEC) process is performed during call setup for an MS-to-MS call according to the teachings of the present invention.

FIG. 2 is a message flow diagram illustrating the flow of messages between the nodes of a cellular network when the ETEC process is performed during call setup for an MS-to-MS call according to the teachings of the present invention. A first MS (MS-1) 21 originates call setup at 22 over the IS-136 air interface to the originating Base Transceiver Station/Mobile Switching Center (BTS/MSC-1) 23. One of the IS-136-based codecs utilized for the call segment over the air, for example, an Algebraic Code Excited Linear Prediction (ACELP) codec may be utilized as today. Other codecs which may be utilized include Vector Sum Excitation Linear Prediction (VSELP), Regular Pulse Excitation-Long Term Predictor (RPE-LTP), and Conjugate Structure-Algebraic Code Excited Linear Prediction (CS-ACELP).

In the originating BTS/MSC-123, the TRAU that normally provides the transcoding from ACELP to G.711 is bypassed. The process of obtaining the routing number or Temporary Location Directory Number (TLDN) of the called MS-2 takes place according to ANSI-41 as today. The originating BTS/MSC-1 sends a Location Request (LocReq) Invoke message 24 to the Home Location Register (HLR) 25 to obtain location information for the called MS. The HLR sends a Routing Request (RouteReq) Invoke message 26 to the serving BTS/MSC-2 27. The serving BTS/MSC-2 sends a page 28 to the called MS-2 29 which sends a response at 30. The serving BTS/MSC-2 then sends a RouteReq Return Result (RR) message 31 to the HLR and includes the TLDN of the called MS. The HLR then sends a LocReq RR 32 to the originating BTS/MSC-1 and includes the TLDN.

The originating BTS/MSC-1 23 then routes the call to the serving BTS/MSC-2 27 through an ISUP Initial Address Message (IAM) 33 containing, in the User-to-User parameter, an indication of the requested codec (e.g, ACELP). The ISUP LAM call setup message is received by the serving BTS/MSC-2 with the User-to-User parameter indicating the requested codec to be used in the call.

At 34, the serving BTS/MSC-2 27 notifies the called MS-2 29 of the incoming call, and the MS-2 returns a phone ring signal 35. The serving BTS/MSC-2 then sends an Address Complete Message (ACM) 36 to the originating BTS/MSC-1 23 and includes a confirmation of the requested codec. If the radio interface between the serving BTS/MSC-2 and the MS does not support the native codec choice of MS-1 21, the serving BTS/MSC-2 reverts back to default ISUP signaling and sends a standard ACM message. In this case, the G.711/PCM codec is utilized between the two MSCs, as is today. However, even in this case involving different native mobile codecs, BTS/MSC-2 can, in certain situations, send an ACM message with confirmation of the native codec of the calling party (MS-1). This utilization of the calling party's codec occurs only if BTS/MSC-2 is capable of transcoding between the two native codecs. The prioritization of codec selection is based on the native codec choice of the calling party, MS-1. As shown later in FIG. 6, this reduces the number of transcodings and thus helps improve speech quality for the audio stream in the call.

The originating BTS/MSC-1 then provides a ringing tone 37 to the calling MS-1 21. The called MS-2 then sends a connect signal 38 to the serving BTS/MSC-2. The serving BTS/MSC-2 then sends an Answer Message (ANM) 39 to the originating BTS/MSC-1. The originating BTS/MSC-1 then connects the call to the calling MS-1 at 40.

Thus, in the present intention, there is no transcoding in the originating MSC to G.711 (on PCM), and there is no transcoding back from G.711 (from PCM) to an IS-136 codec. Thus, the ETEC process passes the audio stream of the selected codec directly unaltered from the calling MS-1 to the called MS-2. This results in improved speech quality and reduced speech delay. In the segment between the originating BTS/MSC-1 and the serving BTS/MSC-2, the audio stream (<64 Kbs) is passed through the 64 Kbs PCM link. A bit-stuffing mechanism may be utilized to fit the audio stream through the 64 Kbs PCM link.

MS to/from H.323 Client

Figure 3:
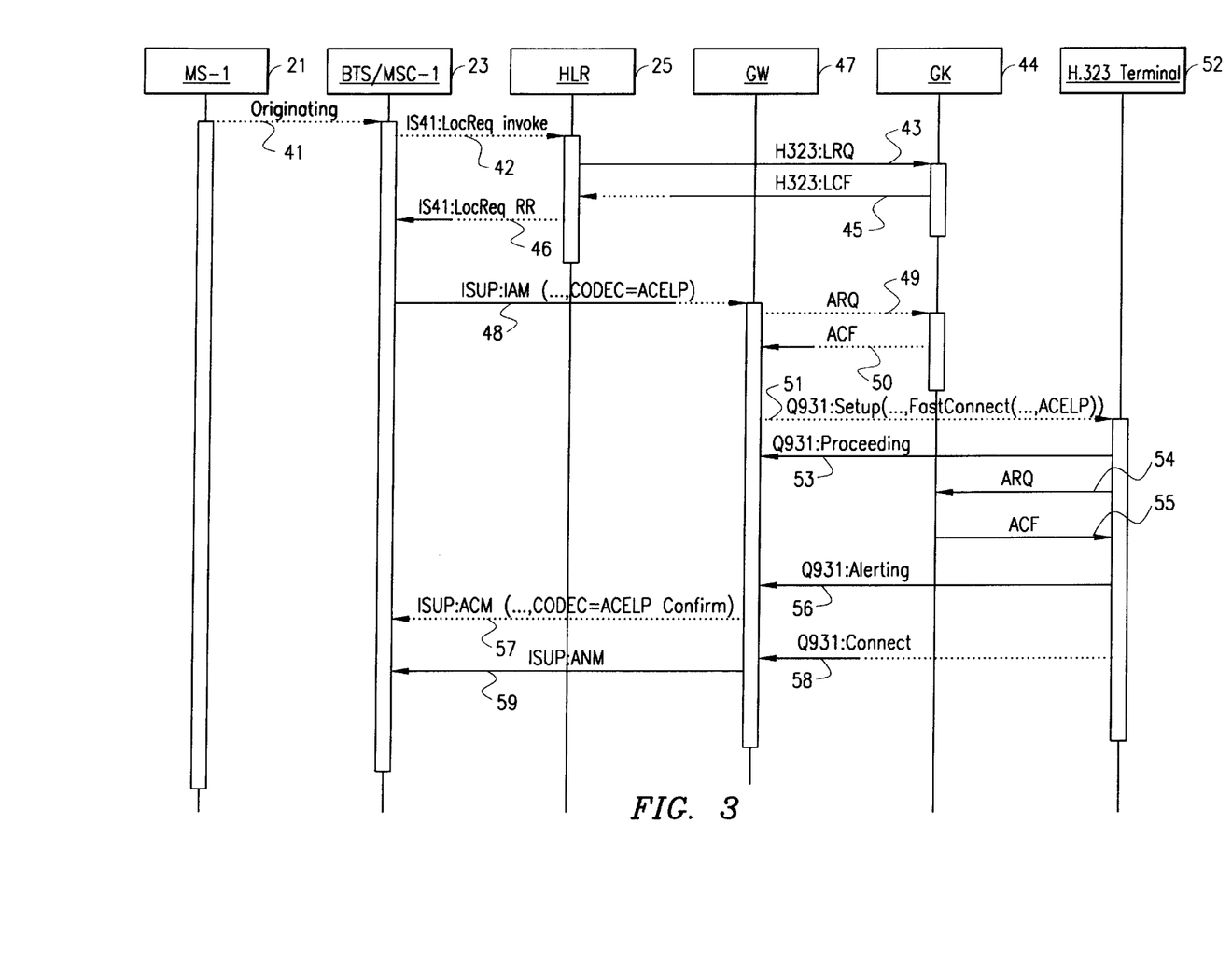
FIG. 3 is a message flow diagram illustrating the flow of messages between the nodes of an integrated cellular and IP network when the ETEC process is performed using Integrated Services Digital Network User Part (ISUP) signaling during call setup and the H.323 Fast Connect procedure for a call from an MS to an H.323 client terminal according to the teachings of the present invention.
Figure 4:
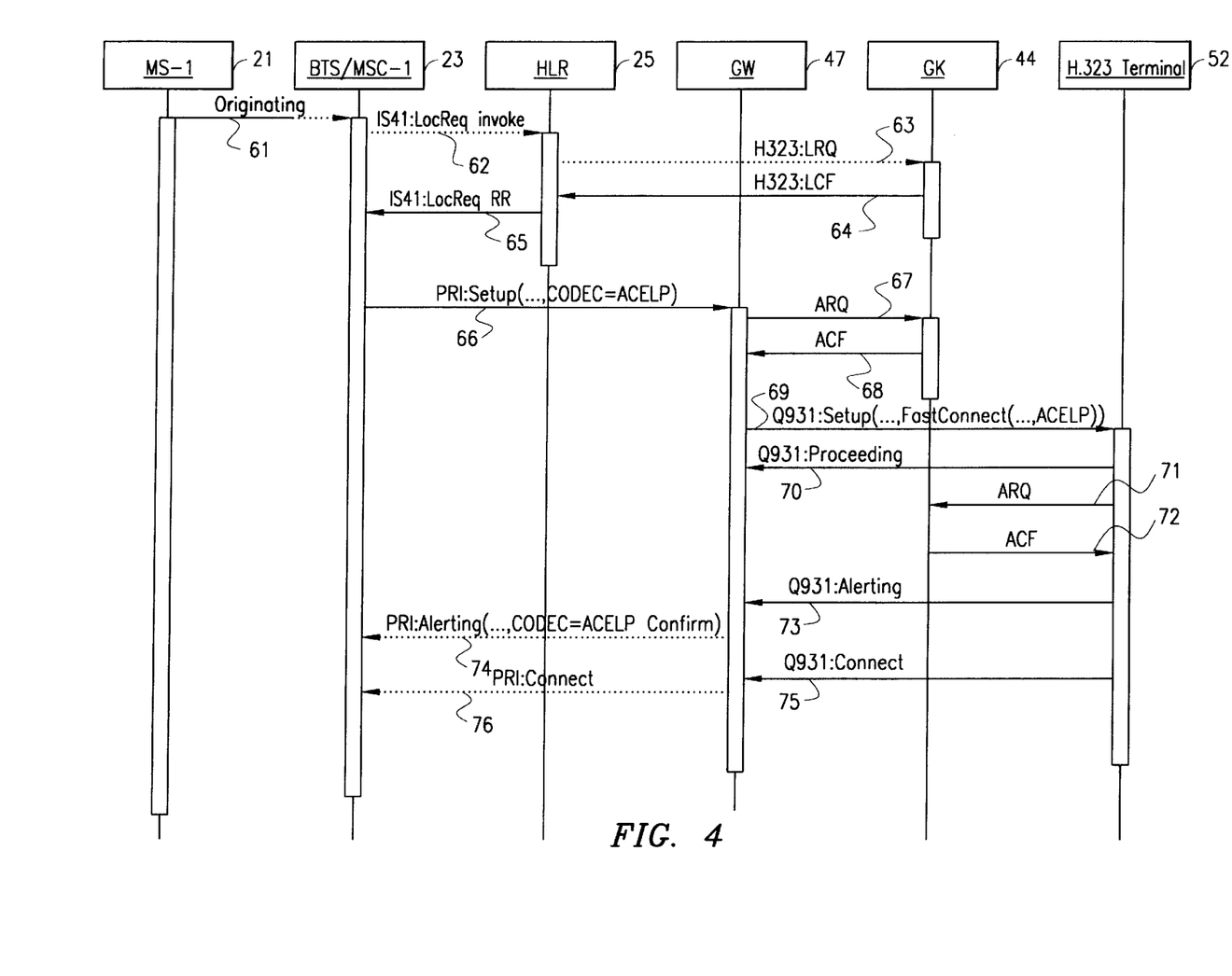
FIG. 4 is a message flow diagram illustrating the flow of messages between the nodes of an integrated cellular and IP network when the ETEC process is performed using Primary Rate Interface (PRI) signaling during call setup and the H.323 Fast Connect procedure for a call from an MS to an H.323 client terminal according to the teachings of the present invention.
Figure 5:
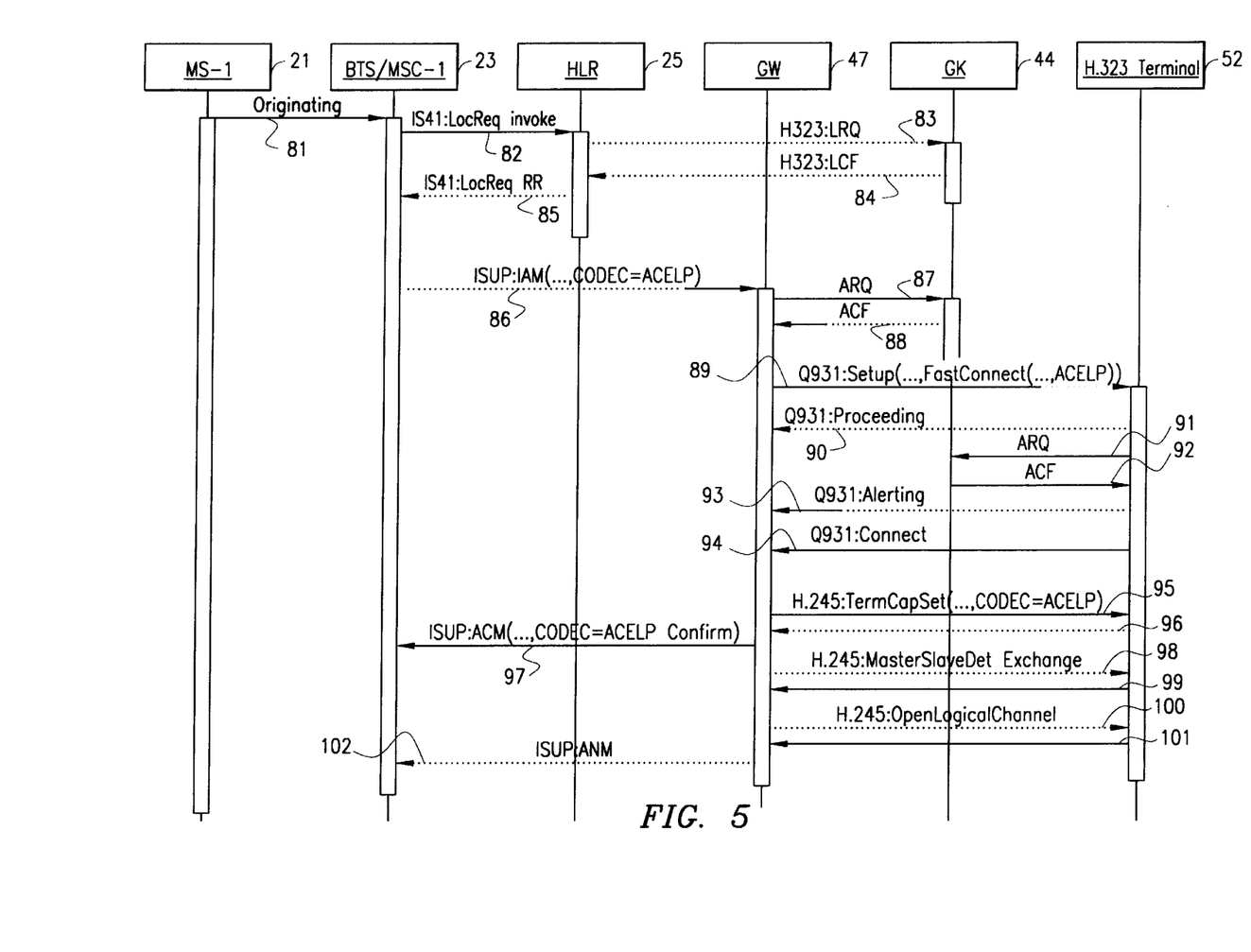
FIG. 5 is a message flow diagram illustrating the flow of messages between the nodes of an integrated cellular and IP network when the ETEC process is performed using ISUP signaling during call setup, and showing the Terminal Capability exchange and Open Logical Channel process for a call from an MS to an H.323 client terminal according to the teachings of the present invention.

FIGS. 3–5 illustrate three scenarios for calls from an MS-1 to an H.323 client terminal. As noted above, there is no support under TFO for such calls because TFO is designed only for MS-to-MS calls.

FIG. 3 is a message flow diagram illustrating the flow of messages between the nodes of an integrated cellular and IP network when the ETEC process is performed using ISUP signaling during call setup and the H.323 Fast Connect procedure for a call from an MS to an H.323 client terminal according to the teachings of the present invention. The calling MS-1 21 originates call setup at 41 over the IS-136 air interface to the originating BTS/MSC-1 23. One of the IS-136-based codecs utilized for the call segment over the air, for example, an ACELP codec may be utilized as today. In the originating BTS/MSC-1, the TRAU that normally provides the transcoding from ACELP to G.711 is bypassed. The originating BTS/MSC-1 sends a LocReq Invoke message 42 to the HLR 25 to obtain location information for the called H.323 client terminal.

The HLR obtains the location of the called H.323 terminal by sending an H.323 Location Request (LRQ) message 43 to a Gatekeeper (GK) 44 which returns the location information in an H.323 Location Confirm (LCF) message 45. The HLR then sends a LocReq RR message 46 to the originating BTS/MSC-1 with the location information (i.e., Gateway 47).

The originating MSC then sends an ISUP IAM message 48 to the Gateway (GW) 47 and includes, in the User-to-User parameter, an indication that the requested codec is an ACELP codec. The Gateway 47 initiates Registration, Access and Status (RAS) messages toward the Gatekeeper for admission to the LAN/WAN network as normal. The Gateway sends an Admission Request (ARQ) message 49 to the Gatekeeper 44 which returns an Admission Confirm (ACF) message 50. To speed up the H.245 capability exchange process and subsequent choice of native codec, the H.323 Fast Connect procedure may be utilized at this point. This procedure includes H.245 information as part of the H.225 Q.931 Setup User-to-User information entity field. An H.225 fastStart option supports the signaling needed to open a logical channel. The fastStart option uses the Open Logical Channel structure defined in H.245, but the sender indicates the modes it prefers for transmitting and receiving, and the transport address where it expects to receive media streams.

In the scenario illustrated in FIG. 3, the Fast Connect procedure is utilized, therefore, the Gateway 47 sends a Q.931 Setup message 51 to the called H.323 terminal 52 and includes an indication that the Fast Connect procedure is being utilized, and an indication that the requested codec is an ACELP codec. The called H.323 terminal responds by sending a Q.931 Proceeding signal 53 to the Gateway. H.225 RAS messages are then exchanged between the H.323 terminal 52 and the Gatekeeper 44 as the H.323 terminal sends an ARQ message 54 to the Gatekeeper, and the Gatekeeper returns an ACF message 55 to the terminal. The H.323 terminal then sends a Q.931 Alerting signal 56 to the Gateway. The Gateway then sends an ISUP ACM message 57 to the originating BTS/MSC-1 23, and includes a confirmation of the requested codec. If the H.323 terminal does not support the native codec choice of MS-1 21, the Gateway reverts back to default ISUP signaling and sends a standard ACM message. In this case, the G.711/PCM codec is utilized between the two MSCs, as today. Otherwise, the called H.323 terminal then sends a Q.931 Connect signal 58 to the Gateway. The Gateway then sends an ISUP ANM message 59 to the originating BTS/MSC-1.

FIG. 4 is a message flow diagram illustrating the flow of messages between the nodes of an integrated cellular and IP network when the ETEC process is performed using PRI signaling during call setup and the H.323 Fast Connect procedure for a call from an MS to an H.323 client terminal according to the teachings of the present invention. The calling MS-1 21 originates call setup at 61 over the IS-136 air interface to the originating BTS/MSC-1 23. One of the IS-136-based codecs utilized for the call segment over the air, for example, an ACELP codec may be utilized as today. In the originating BTS/MSC-1, the TRAU that normally provides the transcoding from ACELP to G.711 is bypassed. The originating BTS/MSC-1 sends a LocReq Invoke message 62 to the HLR 25 to obtain location information for the called H.323 Terminal 52.

The HLR obtains the location of the called H.323 Terminal by sending an H.323 LRQ message 63 to the Gatekeeper (GK) 44 which returns the location information in an H.323 LCF message 64. The HLR then sends a LocReq RR message 65 to the originating BTS/MSC-1 with the location information (i.e., Gateway 47).

The originating MSC then sends a PRI Setup message 66 to the Gateway 47 and includes, in the User-User parameter, an indication that the requested codec is an ACELP codec. The Gateway initiates RAS messages toward the Gatekeeper for admission to the LAN/WAN network as normal. The Gateway sends an ARQ message 67 to the Gatekeeper 44 which returns an ACF message 68. The Gateway examines the requested codec type. Based on the bandwidth of the incoming codec stream, a different window size is used to minimize delay. For larger bandwidth streams such as G.711, a smaller window size is selected such as 10 milliseconds. Compressed audio streams such as GSM may be allocated larger window sizes.

In the scenario illustrated in FIG. 4, the H.323 Fast Connect procedure is utilized, therefore, the Gateway 47 sends a Q.931 Setup message 69 to the called H.323 client terminal 52 and includes an indication that the Fast Connect procedure is being utilized, and an indication that the requested codec is an ACELP codec. The called H.323 terminal responds by sending a Q.931 Proceeding signal 70 to the Gateway. H.225 RAS messages are then exchanged between the H.323 terminal 52 and the Gatekeeper 44 as the H.323 terminal sends an ARQ message 71 to the Gatekeeper, and the Gatekeeper returns an ACF message 72 to the terminal. The H.323 terminal then sends a Q.931 Alerting signal 73 to the Gateway. The Gateway then sends a PRI Alerting message 74 to the originating BTS/MSC-1 23, and includes a confirmation of the requested codec. If the H.323 terminal does not support the native codec choice of MS-1 21, the Gateway reverts back to default ISUP signaling and sends a standard PRI Alerting message. In this case, the G.711/PCM codec is utilized between the two MSCs, as today. Otherwise, the called H.323 terminal then sends a Q.931 Connect signal 75 to the Gateway. The Gateway then sends a PRI Connect message 76 to the originating BTS/MSC-1.

FIG. 5 is a message flow diagram illustrating the flow of messages between the nodes of an integrated cellular and IP network for endpoints not supporting H.323 version 2 or better, when the ETEC process is performed using ISUP signaling during call setup, and showing the Terminal Capability exchange and Open Logical Channel process for a call from an MS to an H.323 client terminal according to the teachings of the present invention. The calling MS-1 21 originates call setup at 81 over the IS-136 air interface to the originating BTS/MSC-1 23. One of the IS-136-based codecs utilized for the call segment over the air, for example, an ACELP codec may be utilized as today. In the originating BTS/MSC-1, the TRAU that normally provides the transcoding from ACELP to G.711 is bypassed. The originating BTS/MSC-1 sends a LocReq Invoke message 82 to the HLR 25 to obtain location information for the called H.323 Terminal 52.

The HLR obtains the location of the called H.323 client terminal by sending an H.323 LRQ message 83 to the Gatekeeper (GK) 44 which returns the location information in an H.323 LCF message 84. The HLR then sends a LocReq RR message 85 to the originating BTS/MSC-1 with the location information (i.e., Gateway 47).

The originating MSC then sends an ISUP IAM message 86 to the Gateway (GW) 47 and includes, in the User-to-User parameter, an indication that the requested codec is an ACELP codec. The Gateway 47 sends an ARQ message 87 to the Gatekeeper 44 which returns an ACF message 88.

In the scenario illustrated in FIG. 5, the H.323 Fast Connect procedure is utilized, therefore, the Gateway 47 sends a Q.931 Setup message 89 to the called H.323 terminal 52 and includes an indication that the Fast Connect procedure is being utilized, and an indication that the requested codec is an ACELP codec. The called H.323 terminal responds by sending a Q.931 Proceeding signal 90 to the Gateway. H.225 RAS messages are then exchanged between the H.323 terminal 52 and the Gatekeeper 44 as the H.323 terminal sends an ARQ message 91 to the Gatekeeper, and the Gatekeeper returns an ACF message 92 to the terminal. The H.323 terminal then sends a Q.931 Alerting signal 93 and a Q.931 Connect signal 94 to the Gateway.

An H.245 session then commences between the Gateway and the client terminal. H.225 signaling takes place normally between the Gateway and the client terminal 52 resulting in a reliable H.245 channel being established. A capability exchange procedure is performed between the Gateway and the terminal, and during this procedure, an H.245 Terminal Capability exchange is performed at 95 and 96, and the requested codec is confirmed. The Gateway then sends an ISUP ACM message 97 to the originating BTS/MSC-1 23, and includes a confirmation of the requested codec.

An H.245 Master/Slave Detection Exchange is then performed at 98 and 99 between the Terminal and the Gateway. At 100 and 101, an Open Logical Channel exchange is performed between the Terminal and the Gateway. The Gateway then sends an ISUP ANM message 102 to the originating BTS/MSC-1.

The H.245 signaling results in a Real Time Protocol (RTP) unreliable channel being opened on the LAN/WAN between the H.323 Client and Gateway. Within the RTP header, the Payload Type field is used to identify the codec chosen and H.245. A Unique Payload type number is assigned to each codec used. This number is used by RTP at the Gateway and the H.323 client to ensure that the voice stream is sent to the correct codec.

As a result, the audio stream of the selected codec is passed directly unaltered from the air interface to the H.323 Client. In the segment between the originating MSC and the H.323 Gateway, the audio stream (<64 Kb) is passed through the 64 Kb PCM link. Bit stuffing may be utilized to fit the audio stream through the 64 Kb PCM link. Thus, in the present intention, there is no transcoding in the originating MSC to G.711 (on PMC), and there is no transcoding back from G.711 to the codec supported by the client. This results in improved speech quality and reduced speech delay.

Figure 6:
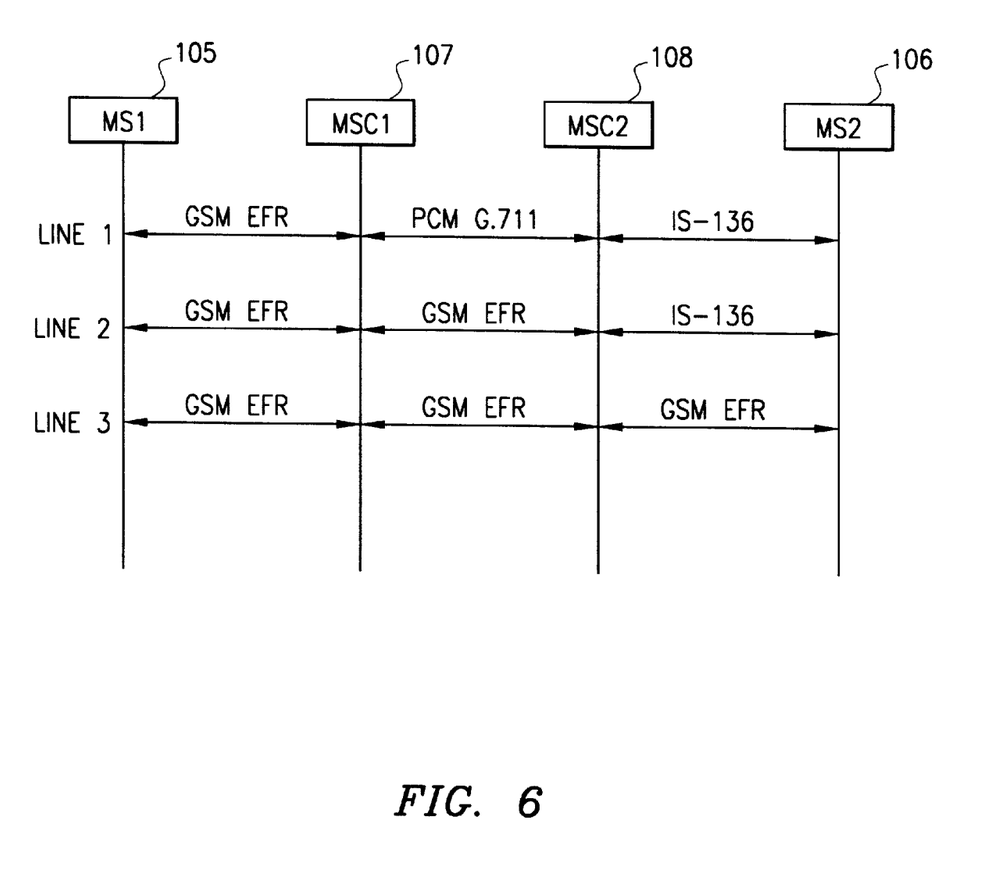
FIG. 6 is a message flow diagram illustrating the reduction of transcodings achieved by the present invention in an MS-to-MS call between MSs having different native codecs.

FIG. 6 is a message flow diagram illustrating the reduction of transcodings achieved by the present invention in an MS-to-MS call between MSs having different native codecs. In this scenario, MS1 105 utilizes a different native codec than MS2 106. For example, MS1 may utilize an ACELP codec while MS2 utilizes a GSM-EFR codec. MSC1 107 is the serving MSC for MS1 and MSC2 108 is the serving MSC for MS2.

Line 1 illustrates exemplary codecs utilized in an MS-to-MS call as today. As shown, two transcodings are required, one from GSM EFR to PCM G.711, and one from PCM G.711 to IS-136. Line 2 illustrates the situation in which the present invention is utilized, and MSC1 107 and MSC2 108 understand the GSM EFR codec, but MS2 106 does not. In this case, the number of transcodings is reduced by the present invention to one. Line 3 illustrates the situation in which the present invention is utilized, and both MSs and both MSCs understand the GSM EFR codec. In this case, GSM EFR is utilized throughout the call, and no additional transcodings are required.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A method of reducing speech delay and improving speech quality in a digital transmission system by implementing a single coder-decoder (codec) for an entire speech path from a calling mobile subscriber to a called client terminal in a data network, said method comprising the steps of:

originating a call from the calling mobile subscriber to a mobile switching center (MSC) which is serving the calling subscriber;

utilizing out-of-band signaling during call setup, said signaling step comprising the steps of:

sending an indication of a requested codec type from the MSC to a gateway in the data network serving the called client terminal;

determining whether the called client terminal supports the requested codec type; and sending a confirmation of the requested codec type from the gateway to the MSC, upon determining that the called client terminal supports the requested codec type;

establishing a speech path from the calling mobile subscriber to the called client terminal; and performing a single codec translation for the speech path;

wherein the step of determining whether the called client terminal supports the requested codec type is performed utilizing a H.323 Fast Connect procedure.

2. The method of reducing speech delay and improving speech quality of claim 1 wherein the steps of sending an indication of a requested codec type from the MSC to the gateway, and sending a confirmation of the requested codec type from the gateway to the MSC are performed utilizing Integrated Services Digital Network User Part (ISUP) signaling.

3. The method of reducing speech delay and improving speech quality of claim 1 wherein the steps of sending an indication of a requested codec type from the MSC to the gateway, and sending a confirmation of the requested codec type from the gateway to the MSC are performed utilizing Primary Rate Interface (PRI) signaling.

* * * * *